(12) United States Patent
Deri et al.

(10) Patent No.: US 8,514,475 B2
(45) Date of Patent: Aug. 20, 2013

(54) ELECTRO-OPTIC DEVICE WITH GAP-COUPLED ELECTRODE

(75) Inventors: Robert J. Deri, Pleasanton, CA (US); Mark A. Rhodes, Pleasanton, CA (US); Andrew J. Bayramian, Manteca, CA (US); John A. Caird, San Francisco, CA (US); Mark A. Henesian, Livermore, CA (US); Christopher A. Ebbers, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 443 days.

(21) Appl. No.: 12/913,651

(22) Filed: Oct. 27, 2010

(65) Prior Publication Data

US 2012/0105931 A1    May 3, 2012

(51) Int. Cl.
   *G02F 1/03* (2006.01)
(52) U.S. Cl.
   USPC ........................................ 359/254
(58) Field of Classification Search
   USPC ........................................ 359/254
   See application file for complete search history.

(56) References Cited

U.S. PATENT DOCUMENTS

| | | | | |
|---|---|---|---|---|
| 4,229,079 A * | 10/1980 | Wayne et al. | ........... | 359/245 |
| 4,270,847 A * | 6/1981 | Meyer | ........... | 359/254 |
| 4,615,588 A * | 10/1986 | Goldhar et al. | ........... | 359/254 |
| 5,802,223 A * | 9/1998 | Nashimoto | ........... | 385/8 |
| 6,016,023 A * | 1/2000 | Nilsson et al. | ........... | 310/341 |
| 2006/0228564 A1* | 10/2006 | Demiryont | ........... | 428/426 |
| 2008/0135211 A1* | 6/2008 | Yassour | ........... | 165/80.4 |
| 2009/0201483 A1* | 8/2009 | Janssens et al. | ........... | 355/71 |
| 2009/0263068 A1* | 10/2009 | Nayyer | ........... | 385/9 |
| 2011/0273762 A1* | 11/2011 | Nugent | ........... | 359/322 |

FOREIGN PATENT DOCUMENTS

WO        2010061214 A1    6/2010

OTHER PUBLICATIONS

Chopra et al., "Transparent conductors—a status review", Thin Solid Films, 1983; 102:1-46.
Eimerl, "Thermal aspects of high-average-power electrooptic switches", IEEE J. Quantum Electron., Dec. 1987; QE-23(12):2238-2251.
Füchsel et al., "Low temperature deposition of indium tin oxide films by plasma ion-assisted evaporation", Applied Optics, May 2008; 47(13):C297-C302.
Goldhar et al., "Large-aperture electrooptical switches with plasma electrodes", IEEE J. Quantum Electron. Jul. 1986; QE-22(7):1137-1147.

(Continued)

*Primary Examiner* — Joseph P Martinez
(74) *Attorney, Agent, or Firm* — Kilpatrick Townsend & Stockton

(57) ABSTRACT

An electro-optic device includes an electro-optic crystal having a predetermined thickness, a first face and a second face. The electro-optic device also includes a first electrode substrate disposed opposing the first face. The first electrode substrate includes a first substrate material having a first thickness and a first electrode coating coupled to the first substrate material. The electro-optic device further includes a second electrode substrate disposed opposing the second face. The second electrode substrate includes a second substrate material having a second thickness and a second electrode coating coupled to the second substrate material. The electro-optic device additionally includes a voltage source electrically coupled to the first electrode coating and the second electrode coating.

28 Claims, 9 Drawing Sheets

(56) References Cited

OTHER PUBLICATIONS

Nakano et al., "A thermally compensated, deuterated KDP Q-switch for high average power lasers", Proc. Conf. on Lasers and Electrooptics (Optical Soc. America, Washington DC) 2002. p. 179.

Nath et al., "Preparation of In2O3 and Tin-Doped In2O3 Films by a novel activated reactive evaporation technique", Thin Solid Films, 1980; 69:63-68.

Pawlewicz et al., "Laser-damage-resistant transparent conductive indium tin oxide coatings", Appl. Phys. Lett. Feb. 1, 1979; 34(3):196-198.

Skeldon et al., "Performance of longitudinal mode KD*P Pockels cells with transparent conductive coatings", Proc. SPIE, 1991; 1410 Solid State Lasers II, pp. 116-124.

Skeldon, "Transparent Conductive Coating of KDP Using Ion-Assisted Deposition", Laboratory for Laser Energetics Review, 1992; 43:149-159.

Zhang et al. "A reflecting Pockels cell with aperture scalable for high average power multipass amplifier systems", Optics Express, Jun. 21, 2010; 18(102): A185-A191.

* cited by examiner

ELECTRO-OPTIC DEVICE WITH GAP-COUPLED ELECTRODE

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S Department of Energy and Lawrence Livermore National Security, LLC, for the operation of Lawrence Livermore National Laboratory.

BACKGROUND OF THE INVENTION

Current optical switch technologies for high energy/high power laser beams use an electro-optical Pockels Cell based on deuterated potassium dihydrogen phosphate (DKDP) switch crystals, with electric fields applied either in a longitudinal or transverse orientation as shown in FIG. 1. The applied electric field changes the polarization of light beam, and the polarization changes can be converted to intensity modulation and redirection using external polarizers. Devices based on transverse electrode geometries have two drawbacks: they require a large switching voltage (>55 kV at a 25 cm aperture) that increases with aperture size; and the appropriate crystal orientation to achieve electro-optic switching results in an anisotropic optical refractive index in the aperture plane (birefringence), which induces undesired polarization rotation. This birefringence is typically compensated for by using a pair of two matched devices, which typically requires stringent matching of the thicknesses of both crystals to better than 1 μm.

FIG. 1 illustrates definitions for crystal, aperture, and electric field orientations. The longitudinal electric field (E-field) is parallel to the optical propagation direction z, while transverse E-field (along x) is perpendicular to the optical propagation. The optical input has a finite transverse extent in the x-y plane, described by the optical aperture. The crystal thickness is measured along the propagation direction z.

Despite the advances made in high power optical switches, there is a need in the art for improved methods and system related to optical switches.

SUMMARY OF THE INVENTION

According to the present invention, techniques related to optical systems are provided. More particularly, embodiments of the present invention relate to systems for high-power Pockels cells and methods of operating the same. Merely by way of example, the invention has been applied to a Pockels cell with transparent electrodes disposed on substrates spatially separated from the electro-optic crystal. The methods and systems described herein are also applicable to other optical systems suitable for use with amplifier and laser systems.

According to an embodiment of the present invention, an electro-optic device is provided. The electro-optic device includes an electro-optic crystal having a predetermined thickness and a face and an electrode substrate disposed opposing the face. The electrode substrate includes a substrate material having a thickness and an electrode coating coupled to the substrate material. The electro-optic device also includes a voltage source electrically coupled to the electrode coating.

According to another embodiment of the present invention, an electro-optic device is provided. The electro-optic device includes an electro-optic crystal having a predetermined thickness, a first face, and a second face. The electro-optic device also includes a first electrode substrate disposed opposing the first face. The first electrode substrate includes a first substrate material having a first thickness and a first electrode coating coupled to the first substrate material. In an embodiment, the first electrode coating is deposited on the first substrate material. The electro-optic device further includes a second electrode substrate disposed opposing the second face. The second electrode substrate includes a second substrate material having a second thickness and a second electrode coating coupled to the second substrate material. In an embodiment, the second electrode coating is deposited on the second substrate material. Additionally, the electro-optic device includes a voltage source electrically coupled to the first electrode coating and the second electrode coating. The voltage source is operable to apply an electric field across the electro-optic crystal.

According to yet another embodiment of the present invention, a method of operating a Pockels cell is provided. The method includes providing a Pockels cell having a first electrode substrate having an input surface, an output surface, and a first electrode coating coupled to the output surface. The Pockels cell also has an electro-optic crystal disposed adjacent to the first electrode substrate and a second electrode substrate having an input surface, an output surface, and a second electrode coating coupled to the input surface. The method also includes directing an input beam having a first polarization state to impinge on the input surface of the first electrode substrate, passing at least a portion of the input beam through the first electrode substrate, and passing at least a portion of the input beam through the first electrode coating. The method further includes applying a voltage between the first electrode coating and the second electrode coating and changing the first polarization state into a second polarization state using the electro-optic crystal. Additionally, the method includes passing at least a portion of the input beam through the second electrode coating and passing at least a portion of the input beam through the second electrode substrate.

According to a specific embodiment of the present invention, a reflective switch is provided. The reflective switch includes an electrode substrate having a input surface and a second surface opposing the input surface and an electrically conductive coating disposed on the second surface. The reflective switch also includes an electro-optic crystal opposing the electrode substrate and a heat sink thermally coupled to the electro-optic crystal. Application of a voltage to the electrically conductive coating will result in an electric field across the electro-optic crystal, providing the ability to switch the polarization of an input beam.

Numerous benefits are achieved by way of the present invention over conventional techniques. For example, embodiments of the present invention provide methods and systems suitable for modifying the polarization state of an input beam, providing a switching function generally associated with Pockels cells. Pulsed laser systems operating with large pulse energies and high repetition rates (high average power) will benefit from the use of embodiments of the present invention. Such lasers typically utilize an electro-optic switch to route optical pulses in and out of high power optical amplifiers, and to provide gain isolation that prevents parasitic lasing and provides protection against reflections of the laser output. To enable operation at high optical power, embodiments of the present invention utilize a large aperture (greater than 1 cm) and provide a high degree of isolation (on/off ratios of ~100:1) and rapid switching times (of order 100 ns) while withstanding high optical energy and power.

These and other embodiments of the invention along with many of its advantages and features are described in more detail in conjunction with the text below and attached figures.

DETAILED DESCRIPTION OF SPECIFIC EMBODIMENTS

Figure 1:
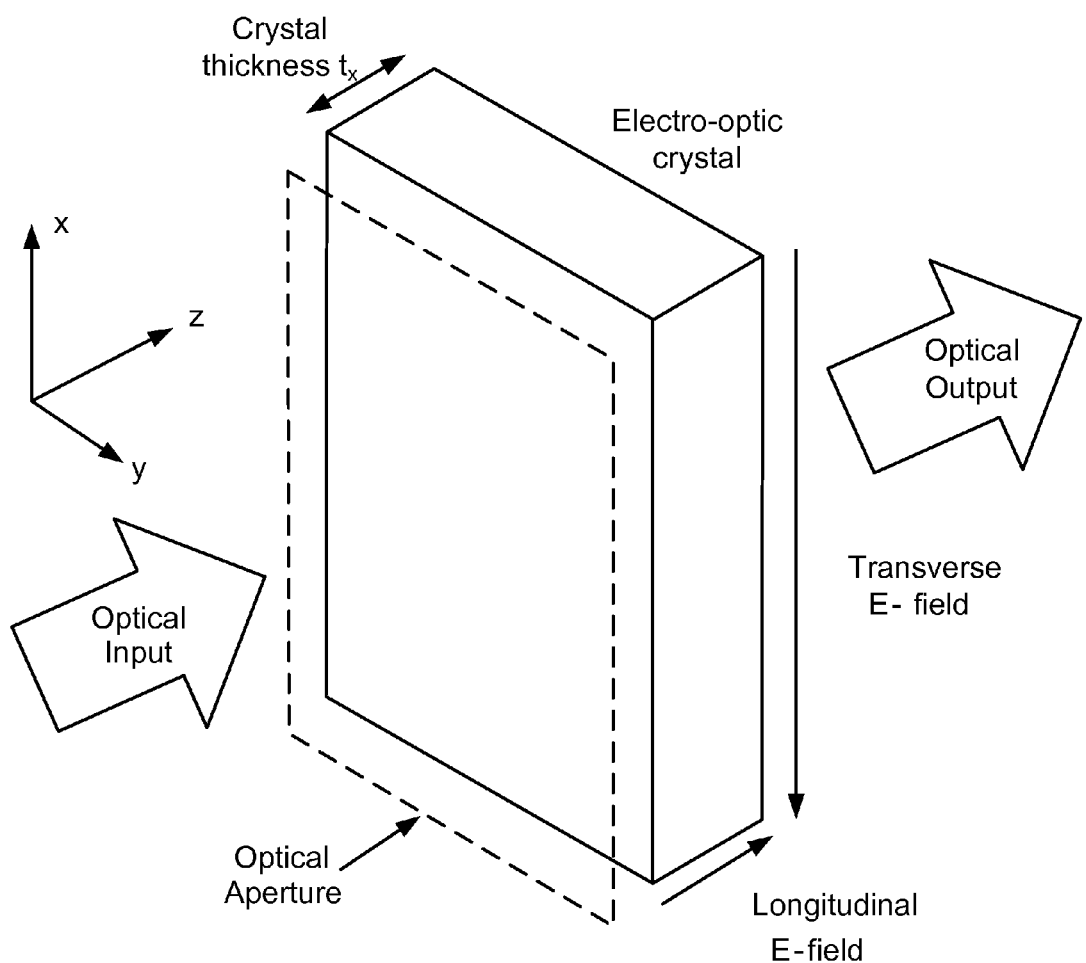
FIG. 1 illustrates definitions for crystal, aperture, and electric field orientations.

According to embodiments of the present invention, optical switches are provided in the form of Pockels cells with longitudinal electrode geometries. According to some embodiments of the present invention, the drive voltage is independent of crystal thickness and the crystal is isotropic in the aperture plane. As described below, the electrodes used to apply the electrode field overlap with the optical aperture, and therefore are transparent or semi-transparent to permit optical propagation.

Pockels cells with ring electrodes leave a portion of the crystal surface unexposed, but use a thicker crystal (i.e., a higher thickness: aperture ratio) in order to achieve a longitudinal electric field with reduced fringing effects. Accordingly, this design results in increased absorption and thermal birefringence. As a result, it is difficult to scale ring electrode devices to large aperture. Longitudinal devices with plasma (low pressure gas phase) electrodes have been constructed, but rely on intimate contact between the plasma and the electro-optic crystal. The plasma prevents heat-sinking the aperture faces of the electro-optic crystal, which renders the device more susceptible to thermal issues arising from residual optical absorption of high power laser light within the crystal. The plasma electrodes also increase the complexity of the device, which impacts its cost and robustness due the required gas handling system, potential for vacuum system leaks, and potential electrode issues such as plasma erosion and arcing.

Embodiments of the present invention utilize a transparent, conductive solid as the electrode in a longitudinal configuration. Transparent, as used herein, includes low absorption materials that are less than 100% transmissive. Therefore, transparent is not intended to denote 100% transmission, but a high transmission at wavelengths of interest, for example, higher than 80%, higher than 85%, higher than 90%, higher than 95%, higher than 96%, higher than 97%, higher than 98%, or higher than 99%. Transparent electrodes of sufficient optical transmission can be fabricated using coating processes of various types (e.g., chemical vapor deposition, sputtering, evaporation, electron beam deposition, spray coating, or the like), based on extremely thin metal layers or transparent, conductive oxides (TCOs) using materials such as indium oxide, tin oxide, indium tin oxide (ITO), other transparent, conductive materials, or the like. TCOs are widely used in devices for displays and photovoltaic cells.

The inventors have determined that transparent electrodes exhibit a non-zero optical absorption. This residual absorption makes the electrode susceptible to optical damage associated with short optical pulses. For example, pulse absorption creates a transient thermal stress which can cause coating failure. Furthermore, electrode absorption increases with coating thickness, while electrode series resistance (sheet resistance) increases with reduced coating thickness. There is thus a tradeoff between switching speed and optical damage resistance in the electrode coatings. To date, a suitable coating with both high optical damage resistance (coating absorption below ~1%) and low sheet resistance (~100 ohms/square) has not been realized on DKDP. Most TCO coating processes have been developed for glass substrates, e.g.; for use in commercial applications such as displays, and employ high temperatures (~300° C. substrate temperature during deposition and/or during a post-deposition anneal) to improve the transparency-resistance tradeoff. While glass substrates are compatible with such high temperature processes, electro-optic crystals are generally not well-suited for such high temperature processes. For example, DKDP crystals undergo a destructive phase transition at 145° C. Thus, efforts to coat ITO directly on electro-optic crystal such as KDP and DKDP have resulted in electrodes with either low damage threshold or high series resistance.

Figure 2:
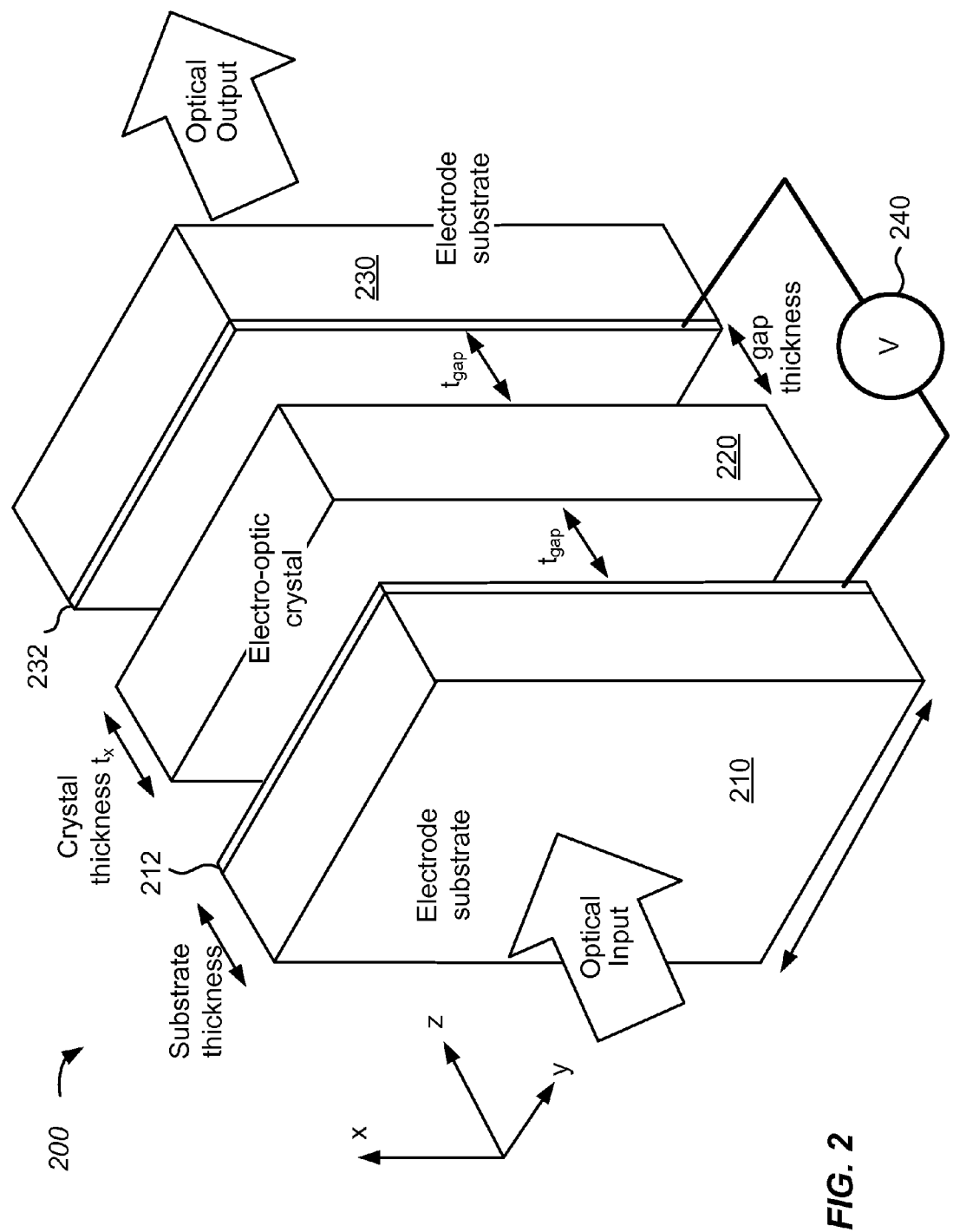
FIG. 2 is a simplified perspective view of an electro-optic device according to an embodiment of the present invention.

FIG. 2 is a simplified perspective view of an electro-optic device according to an embodiment of the present invention. An exemplary electro-optic device that alters the polarization state of an optical input due to application of an applied voltage is a Pockels cell. Throughout this specification, a Pockels cell will be discussed as an example of an electro-optic device provided by embodiments of the present invention, however, the present invention is not limited to Pockels cell implementations. Other electro-optic devices are included within the scope of the present invention.

In one implementation, a Pockels Cell electrode is formed by depositing a transparent, conductive solid coating (i.e., an electrode film) on a transparent optical substrate, not on the electro-optic crystal, and positioning the coated substrate in close proximity to an electro-optic crystal in a longitudinal geometry. Voltage is applied to the electrode films to produce an electric field across the electro-optic crystal. The coating-to-crystal gap is maintained at a small distance in some embodiments to reduce or minimize capacitive voltage drops and therefore switching voltage. Embodiments of the present invention provide numerous advantages including, enabling the substrate for the transparent, conductive coating to be optimized independently from selection of the electro-optic crystal. The substrate can be selected to improve transient cooling of the coating (better thermal conductivity and volumetric heat capacity), reduced coating thermal stress (expansion coefficient matched to coating), and compatibility with high temperature processing (to enable coating annealing that improves resistance and transparency). Another advantage is that by appropriate substrate selection, a high transparency (high optical damage threshold), low resistance electrode can be realized in a non-plasma design.

Additionally, the gap between electrode and crystal can be filled with a transparent, thermally conductive medium to provide face cooling of the crystal. Face cooling is preferred in some embodiments because it reduces thermal birefringence effects in comparison with some edge cooling techniques. It should be noted that anti-reflection (AR) coatings are not illustrated in FIG. 2 for purposes of clarity. As described more fully throughout the present specification, AR coatings can be applied to one or more surfaces of the optical elements to improve performance. One of ordinary skill in the art would recognize many variations, modifications, and alternatives.

According to an embodiment of the present invention, an electro-optic device that alters the polarization state of an optical input due to application of an applied voltage is provided. The electro-optic device includes an electro-optic crystal 220 and a pair of electrode substrates 210/230 (one on each side of the crystal in the embodiment illustrated in FIG. 2). Each of the electrode substrates, also referred to as electrodes, includes a transparent, electrically conductive coating 212/232 on one or more of the surfaces of the electrode substrates. The electrode substrates are separated from the electro-optic crystal by gaps having predetermined thicknesses, which can support a transparent coolant material within the gaps. In one embodiment, the electrodes are pressed directly against the electro-optic crystal, reducing the gap dimension to essentially zero. In an embodiment, the optical input propagates along a direction perpendicular to the faces of the electro-optic crystal and the conductively coated electrode surfaces are oriented parallel to both the crystal faces and the optical aperture. Thus, the device operates in transmission mode.

Referring to FIG. 2, the electro-optic crystal 220 illustrated in the figure comprises deuterated potassium dihydrogen phosphate (DKDP) with a predetermined thickness $t_x$. According to embodiments of the present invention, the thickness of the electro-optic crystal (e.g., DKDP) ranges from about $t_x=3$ mm to about $t_x=30$ mm, for example, $t_x=5$ mm. Thinner crystals (e.g., 5 mm in thickness) are suitable for use in the Pockels cell discussed herein since thinner crystals reduce or minimize thermal birefringence effects due to lower integrated crystal absorption. Crystals thinner than 5 mm are included within the scope of the present invention, providing reduced adverse effects and mechanical robustness. As discussed in relation to FIG. 3, for embodiments utilizing gas-based coolants in the electrode gap, the electro-optic crystal thickness $t_x$ is provided at a sufficient thickness such that the electric field within the gap remains below the dielectric breakdown electric field $E_{BR}$ of the gap coolant:

$$E_{GAP} = \in' V_{SWITCH}/t_x < E_{BR},$$

where $\in'$ is the dielectric constant of the electro-optic crystal, $V_{SWITCH}$ is the switching voltage (e.g., either the crystal half-wave or quarter-wave voltage, depending on the desired degree of polarization rotation). For example, for a 10 mm thick DKDP crystal operated at a half-wave voltage, the gap field is 307 kV/cm. Accordingly, typical gap thickness values of $t \sim 1$ mm are appropriate for He:SF$_6$ gas coolant. As described throughout the present specification, in other embodiments, the gap thickness is reduced to several mils (e.g., 25-50 µm) or less. Thus, a range of gap thicknesses, from several microns to tens of millimeters are included within the scope of the present invention.

Although the electro-optic device illustrated in FIG. 2 utilizes a DKDP crystal, other solids exhibiting an electro-optic effect and good optical transparency are suitable for use in other embodiments. For example, other suitable electro-optic crystals include, without limitation, undeuterated KDP, lithium niobate, potassium titanyl phosphate (KTP), rubidium titanyl phosphate (RTP), rubidium titanyl arsenate (RTA), beta barium borate (BBO), or the like. Additionally, although the electro-optic device illustrated in FIG. 2 utilizes two electrode substrates, this particular implementation is not required by embodiments of the present invention and a single electrode substrate can be utilized in other embodiments. As an example, the electrode elements from a plasma electrode Pockels cell (PEPC) could be utilized as a first electrode and the electrode substrate described herein can be used as a second electrode to form the electro-optic device. Moreover, as discussed in relation to FIG. 8 below, a single electrode substrate can be utilized in reflective implementations. One of ordinary skill in the art would recognize many variations, modifications, and alternatives.

The electrode substrates 210/230 (also referred to as substrates) can be made of any suitable material that provides for high optical transmission, mechanical rigidity, and a substrate appropriate for formation of the electrode coatings 212/232. As an example, the electrode substrates can be sapphire substrates, for example, 1 mm in thickness. Sapphire is suitable for the applications described herein because of its high transparency, good thermal conductivity, and volumetric heat capacity. Sapphire also exhibits a thermal expansion coefficient ($7 \times 10^{-6}$/K) closely matched to ITO, which means that transient heating due to ITO absorption will cause minimal stress in the electrode coating. Thus, embodiments of the present invention prevent device failure resulting from interfacial stresses. In one embodiment, the sapphire is oriented so that it is optically isotropic perpendicular to the direction of optical propagation, which will avoid polarization changes due to the substrate. As an example, the substrate plane can be c-plane sapphire, although this particular configuration is not required by the present invention.

Alternative substrate materials include, without limitation, zinc selenide, zinc oxide, gallium phosphide, ceramics made from these materials, combinations thereof, and the like. Some of these substrates offer lower cost than sapphire coupled with lower thermal performance. Glass and fused silica can also be used as substrates although additional reductions in thermal performance may be associated with these substrates. In some embodiments, the electrode substrate also provides a wave-plate functionality in order to replace an extra wave plate in the optical system and thereby reduce the number of optical elements utilized. The electrode substrate can thus serve a dual function as a suitable substrate surface for formation of the electrode coating as well as a wave plate. As appropriate for wave plate applications, the electrode substrate may actually be multiple plates that are bonded together to provide the wave plate functionality.

Referring once again to FIG. 2, a transparent, conductive electrode coating 212/232 (also referred to as an electrode coating or a transparent, conductive electrode thin film) is provided on one or more surfaces of the electrode substrates 210/230. In an embodiment, the electrode coating is fabricated using Indium Tin Oxide (e.g., 10% to 20% tin in In$_2$O$_3$) (ITO) with a thickness ranging from about 5 nm to about 50 nm. The coating thickness can be adjusted depending on the particular application to optimize the tradeoff between coating transparency and electrical resistance. As an example, the ITO can be deposited on a substrate held at a temperature above 100° C. during the coating process and annealed at a temperature above 100° C. after the coating process.

In the embodiment illustrated in FIG. 2, the electrode coatings are oriented so that the coated electrode surfaces face the electro-optic crystal 220. This orientation provides benefits, including reductions in the capacitive voltage drop (i.e., no voltage drop across the substrates) and thus the switching voltage. An alternative orientation is to orient the electrode coatings with the coated surfaces facing away from the electro-optic crystal. This will typically increase the switching voltage, but simplify, in some configurations, the fabrication of the electrical contact between the conductive coated surface and external power supplies.

Alternative coating materials include any transparent conductive oxide (such as Indium Oxide, Tin Oxide, Zirconium Oxide, Zinc Oxide, or the like), any thin metal coating (such as gold, silver, aluminum, or the like), transparent conductive polymers used in organic light emitting diode (OLED) devices, or other suitable transparent conductive coatings. One of ordinary skill in the art would recognize many variations, modifications, and alternatives.

The electrode coating can be deposited by any of a variety of techniques, including sputtering, reactive sputtering in a partial pressure of $O_2$ for TCOs), thermal evaporation, e-beam evaporation, ion beam assisted deposition, chemical vapor deposition, dip coating, spray coating, or the like. In some implementations, an adhesion layer, for example, Cr or Ti, is provided between the electrode material and the substrate. In other embodiments, a hard coating such as $HfO_2$, a silicate layer, or the like, can be deposited on the substrate prior to the formation of the electrode coating to serve as a buffer layer, an impedance matching layer, or the like. Thus, formation of the electrode coating directly on the electrode substrate is not required by embodiments of the present invention but is discussed merely by way of example.

The substrate temperature and conditions during coating and any post-deposition annealing (e.g., temperature, ambient gas(es), inert gas(es), pressure, and the like) can be optimized to achieve the desired transparency and electrical resistance for the electrode coating. Typical temperatures during deposition and/or annealing can be near 300° C. A typical annealing gas used for the deposition of ITO is 10% $O_2$ in an inert gas such as Ar or $N_2$. In contrast with attempts to deposit transparent conductive coatings on electro-optic crystals, the electrode substrates utilized herein are suitable for high temperature processing, enabling the formation (e.g., by deposition) of transparent conductive coatings with both high transparency and high conductivity.

The gap between each electrode coating and the electro-optic crystal typically ranges from about 0 mm to about 1 mm. In a particular embodiment, the gap is 0.5 mm. As described throughout the present specification, the gap will vary depending on application, with smaller gaps associated with stagnant coolants and larger gaps associated with flowing coolants. In some implementations, the gap is made as thin as possible to minimize the switching voltage, consistent with mechanical stability, robustness, and uniformity constraints. The switching voltage is given by:

$$V_{SWITCH} = (V_\pi/m)\{1 + 2(t_{GAP}/\epsilon'_{GAP})/(t_x/\epsilon'_x)\}$$

where $V_\pi$ is the crystal half-wave voltage, $t_x$ is the thickness of the electro-optic crystal, $t_{GAP}$ is the gap thicknesses, $\epsilon'_x$ is the dielectric constant of the electro-optic crystal, and $\epsilon'_{GAP}$ is the dielectric constant of the material in the gap. The integer m describes the switching configuration (m=1 for half-wave, m=2 for quarter-wave). In some implementations, the gap thickness is adjusted to minimize the impact of gap variations on optical transmission uniformity across the aperture. In some embodiments, switching voltages on the order of 20 to 30 kV are provided with switching times on the order of 100 to 150 ns. In a particular design, a switching time on the order of 50 ns is achieved. Other switching voltages and switching times are included within the scope of the present invention.

The local crystal polarization rotation depends on the local electric field in the crystal. If the gap dimension is not constant across the aperture of the device, then the output polarization can be nonuniform. When placed between polarizers, this nonuniformity can result in a lateral nonuniformity of the optical intensity profile. For example, for a half-wave switch based on highly deuterated KDP ($V_\pi/m = 6.4$ kV, $\epsilon'_x = 48$, $t_x = 25$ mm) with a $t_{GAP} = 0.2$ mm gap ($\epsilon'_{GAP} = 1$), a 10 μm variation in gap dimension changes the crystal voltage by 136 V. This changes the local optical intensity by 0.45%.

Gap thickness variations can result from mechanical assembly imperfections, vibrations, and pressure differences across the electrodes (due to use of high pressure coolant) that cause bowing. For designs that employ flowing coolant, the gap thickness is provided at an appropriate width so that the pressure drop due to flow across the crystal is sufficiently low. In some implementations, the pressure drop results in a gap thicknesses of approximately 0.1 mm for high-pressure flowing gas (e.g., 2~5 atm) and 0.4 mm for flowing liquid.

As discussed above, in one embodiment, the gap thickness is reduced to essentially zero. This can be accomplished by several methods, including mechanically pressing the electrode to the electro-optic crystal (a technique referred to as "dry contact"). The dry contact method benefits from extreme attention to cleanliness of the contacting surfaces in order to avoid creation of defects susceptible to laser induced damage. Another method is "direct bonding" of the electrode and crystal surfaces (sometimes referred to as "diffusion bonding," "adhesive free bonding," or "wafer bonding"). This process may include coating of these surfaces with an $SiO_2$-based material, for example solgel materials that can be employed in AR coatings. Use of a solgel material may provide a coupling layer between the electrode substrate and the electro-optic crystal, so that the gap is non-zero, but direct physical contact is provided between the electrode substrate and the electro-optic crystal. An inorganic fluid may be used in these applications in place of a solgel. Yet another method is bonding with a transparent adhesive. This method utilizes an adhesive that can withstand high optical fluence and power. Other methods of reducing the gap thickness to substantially zero are included within the scope of the present invention and these methods are provided merely by way of example. One of ordinary skill in the art would recognize many variations, modifications, and alternatives.

A flowing or stagnant "coolant" material can be provided within the gap region between the electrode substrates and the electro-optic crystal in order to facilitate cooling of the electro-optic crystal. This coolant can include a transparent gas, liquid, or the like. In one implementation, $SF_6$ gas is used at 2.5 atm pressure, whereas in another implementation, a 1:1 mixture of $SF_6$:He (by volume) at 5 atm is utilized. A stagnant coolant design can use a gas containing at least 2.5 atm partial pressure of $SF_6$ or other appropriate gas to prevent dielectric breakdown. The addition of helium to the gas improves the thermal conductivity of the cooling gas. The composition of the gas coolant can also include a partial pressure of oxygen in order to inhibit chemical decomposition of TCOs at high laser fluence or power. The flow of the coolant may be provided in a pulsed format in which the coolant flows through the device during laser shots, providing a stagnant fluid during the shot and then removing heat using the flowing coolant between shots. Thus, the incorporation of flowing coolants into embodiments of the present invention includes implementations in which the coolant has a non-zero flow rate at some time during a given period.

In an implementation using a cooling liquid, fluorinated decalin (decahydronaphthalene) is provided in the gap region. The purpose of the "coolant" can be to provide a thermal conduction path between the crystal faces and the electrodes (assuming external cooling of the electrode faces), to provide direct heat removal by flowing over the crystal faces, or other cooling functions. As discussed in relation to the transparent electrodes, transparency of the coolant material does not require 100% transmission, but a high transmission value.

In embodiments in which the device is externally cooled by face cooling the substrate faces in an external, flowing fluid, the substrate thickness is typically as thin as possible (to provide low thermal resistance) consistent with mechanical strength. Mechanical strength requirements are impacted by any pressure differential between the gap "coolant" and the medium external to the substrate.

As discussed above, liquids, gases, and combinations thereof, can be used as coolants. Liquids can be used as stagnant or flowing coolants. A benefit provided by flowing coolant liquids is that carbonized byproducts resulting from high optical fluence can be continuously filtered from the liquid to prevent permanent optical degradation. Flowing coolants can use the same gas as indicated above for stagnant coolants, or can use a transparent liquid that is resistant to optical damage. As will be evident to one of skill in the art, device cooling can include heat transfer to flowing fluids that are then cooled (and may be filtered) external to the device. These cooling designs can provide face cooling, which reduces or minimizes thermal birefringence effects.

As illustrated in FIG. 2, the electrode substrates and the electro-optic crystal are disposed along an optical path extending from the optical input to the optical output. In an embodiment, the centers of the various optical elements are disposed along the optical path to form a single optical system including the various illustrated optical elements. Thus, in this embodiment, the electrode substrates are adjacent the electro-optic crystal on opposite sides of the electro-optic crystal and the input and output surfaces of the electrode substrates and the electro-optic crystal are parallel. In other embodiments, the input and output surfaces are generally parallel but tilted to reduce reflections. It should be noted that parallel surfaces are not required for this invention. As an example, the electrode and electro-optic crystal surfaces can be curved and provide a constant gas across the curved surfaces. Thus, the use of parallel in this description is not intended to require plane parallel. One of ordinary skill in the art would recognize many variations, modifications, and alternatives.

Figure 3:
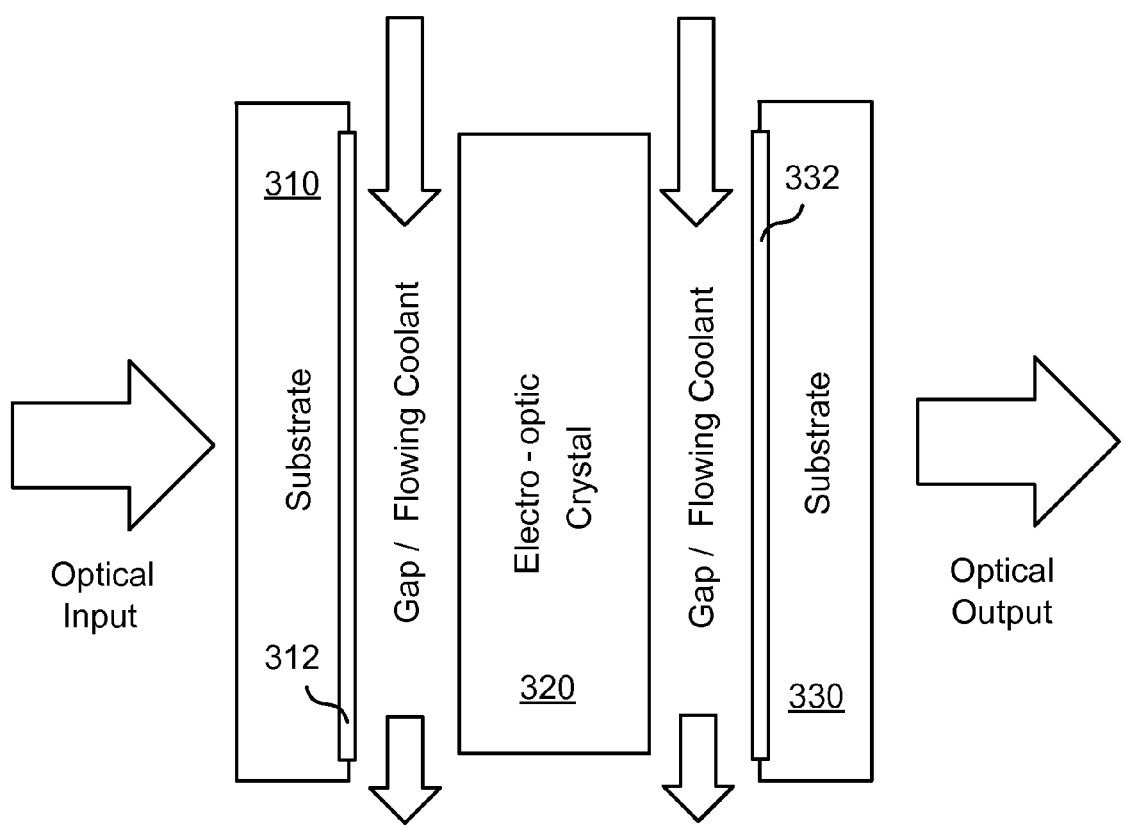
FIG. 3 is a simplified side view of a Pockels cell according to an embodiment of the present invention including a flowing coolant.

FIG. 3 is a simplified side view of a Pockels cell according to an embodiment of the present invention including a flowing coolant. Although FIGS. 3-7 discuss embodiments of the present invention used as Pockels cells, the implementations are not limited to use as Pockels cells and other electro-optic devices are included within the scope of the present invention. Thus, the discussion of Pockels cells is merely provided to provide exemplary embodiments in which the various aspects of the present invention can be illustrated. When the coolant within the gap region is flowing as illustrated in FIG. 3, the coolant can be used for device cooling as described above. The flowing coolant can be externally filtered to prevent buildup of particles and contaminants formed by laser-induced coolant degradation, which could limit reliability under high energy or high power operation. For purposes of clarity in FIG. 3, AR coatings are not illustrated, but can be utilized.

Electrode substrates 310/330 include electrode coatings 312/332. A voltage can be applied across the electro-optic crystal 320. Although the gaps between the electrode coatings and the electro-optic crystal are illustrated as equal in thickness, this is not required by embodiments of the present invention.

Figure 4:
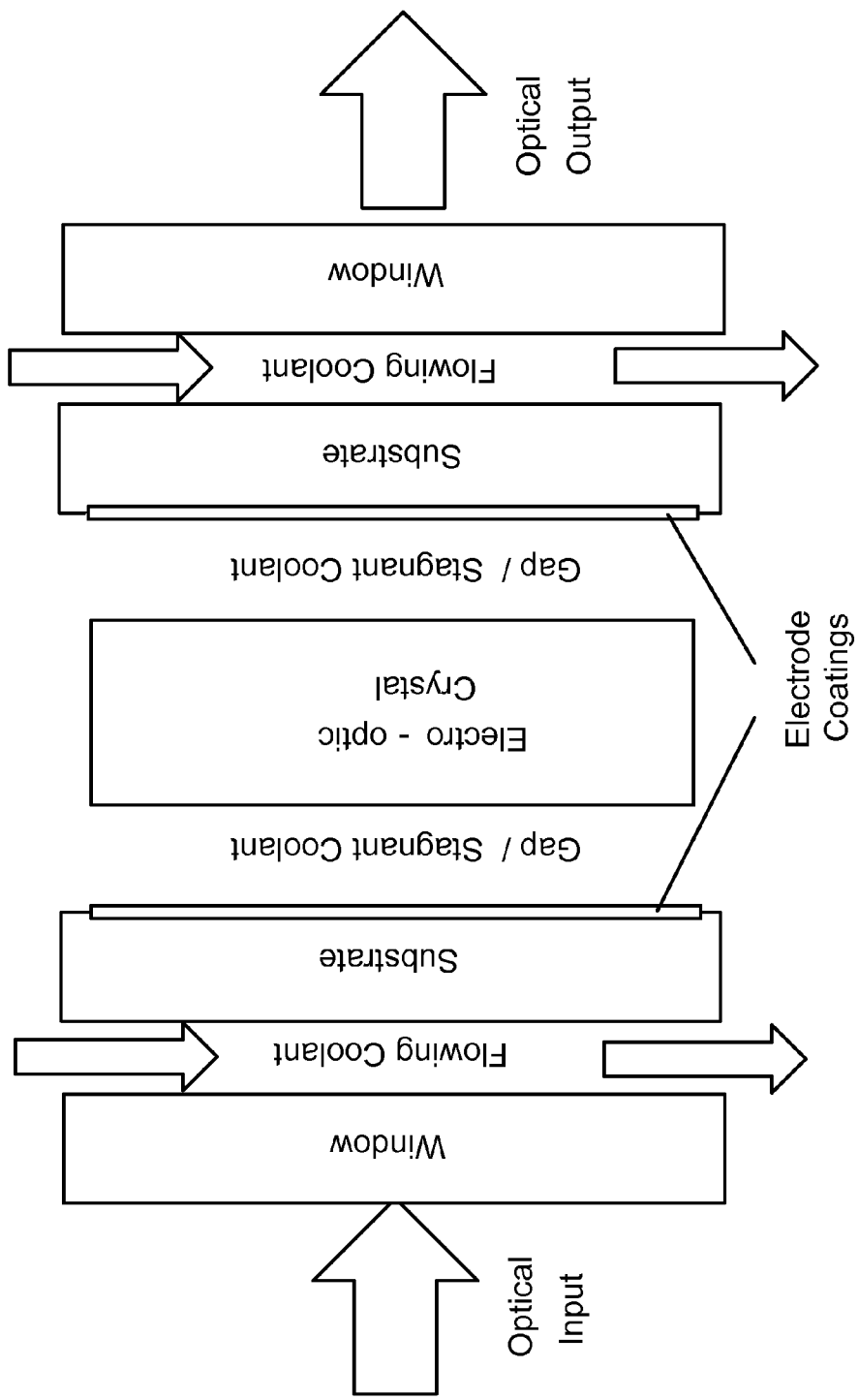
FIG. 4 is a simplified side view of a Pockels cell according to an embodiment of the present invention including an external flowing coolant.

FIG. 4 is a simplified side view of a Pockels cell according to an embodiment of the present invention including an external flowing coolant. In the embodiment illustrated in FIG. 4, the coolant within the electrode gap is stagnant and external cooling is utilized to transfer heat from the stagnant coolant to an external heat sink (not shown). In the embodiment illustrated in FIG. 4, separate coolant flowing over the exterior surfaces of the electrode substrate is provided along with an exterior pair of windows to contain this flowing coolant. In one implementation, the flowing coolant (i.e., exterior coolant) includes high pressure helium gas. Since the flowing coolant is not disposed in a high electric field, $SF_6$ is not required to prevent electrical breakdown. In addition to flowing gas coolants, flowing liquid coolants can also be used. For purposes of clarity in FIG. 4, AR coatings are not illustrated, but can be utilized.

The exterior windows illustrated in FIG. 4 can be any transparent material resistant to optical damage, such as fused silica or sapphire. The thickness of the exterior windows is selected to avoid polarization distortions due to stress birefringence associated with pressure differentials.

Figure 5:
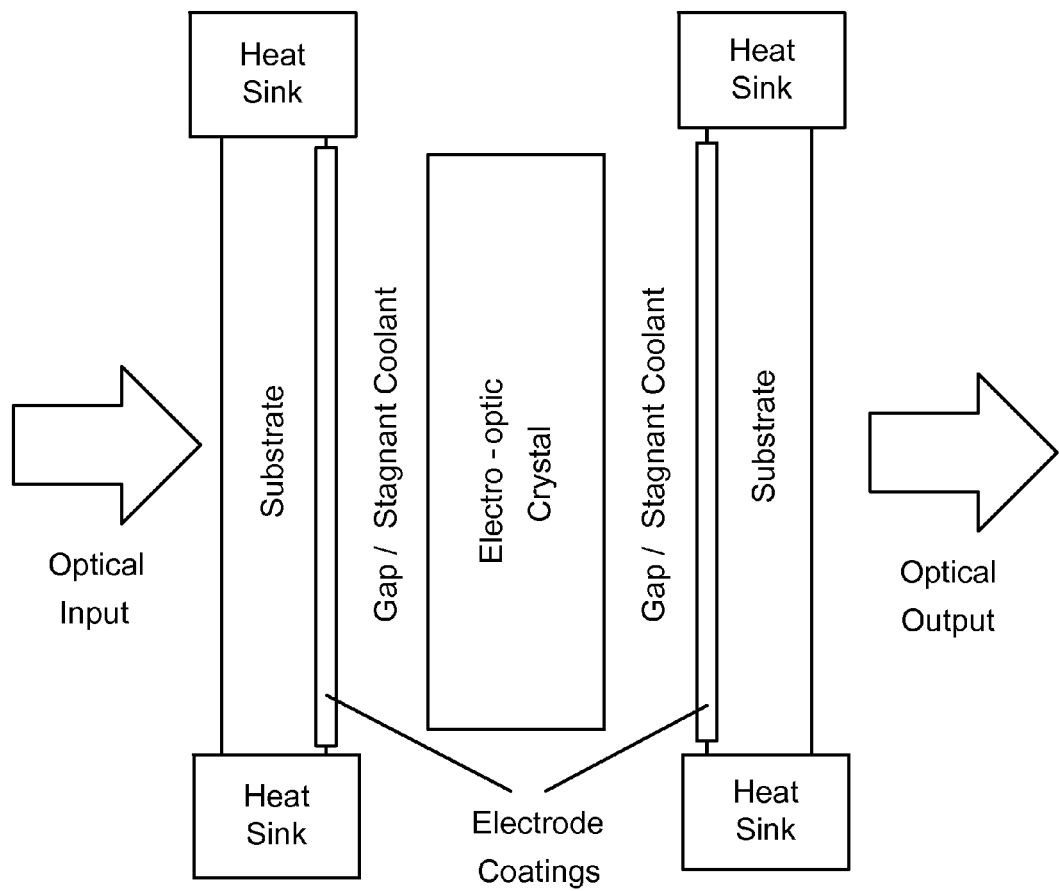
FIG. 5 is a simplified side view of a Pockels cell according to an embodiment of the present invention including lateral conduction.

FIG. 5 is a simplified side view of a Pockels cell according to an embodiment of the present invention including lateral conduction. The alternative design illustrated in FIG. 5 provides conductive cooling of the device by heat sinking the edges of the electrode substrates (i.e., lateral conduction through the electrode substrate). This approach utilizes electrode substrates with sufficient thermal conductivity, such as sapphire, ZnO, ZnS, or the like. Although glass or silica substrates are less suitable for this implementation, they can be used as electrode substrates as well.

Figure 6:
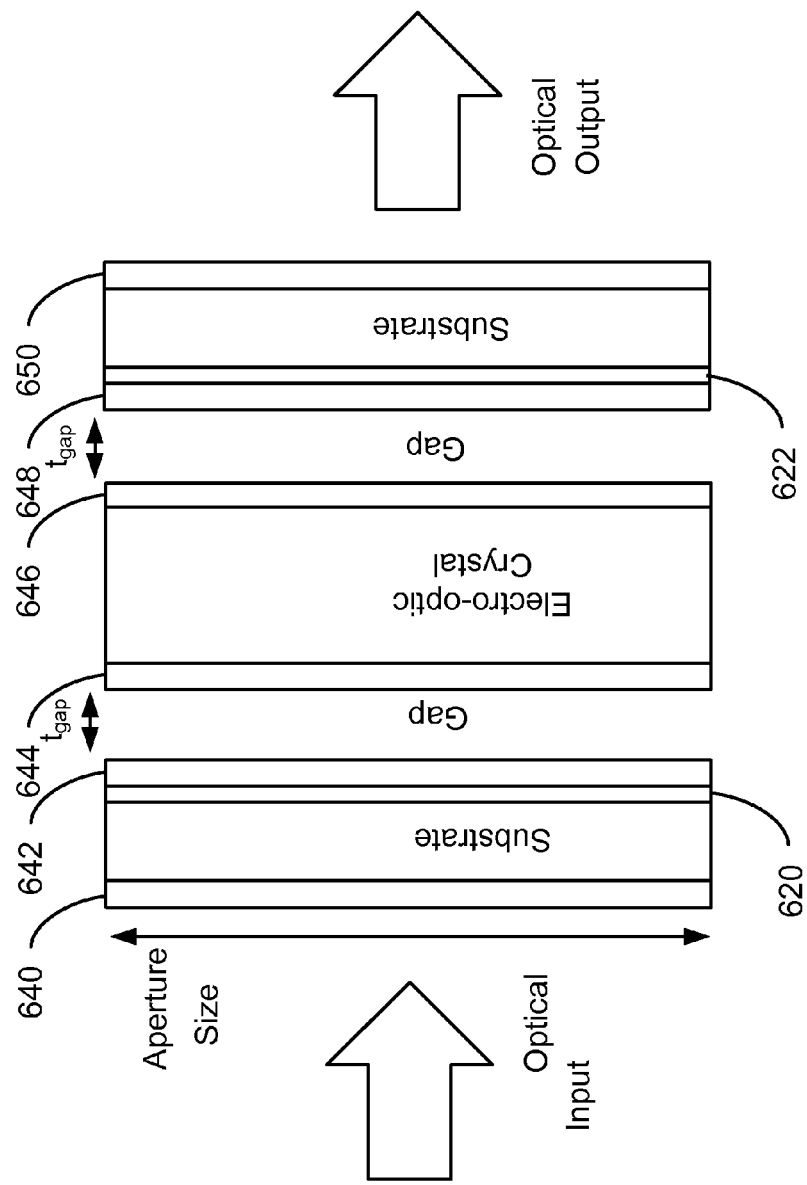
FIG. 6 is a simplified side view of a Pockels cell including anti-reflection coatings according to an embodiment of the present invention.

FIG. 6 is a simplified side view of a Pockels cell including anti-reflection coatings according to an embodiment of the present invention. In typical implementations, all appropriate surfaces of this device will be AR coated, as shown, for example, in FIG. 6. Appropriate surfaces for AR coats include: both surfaces of the electro-optic crystal (644/646); both surfaces of both electrode substrates (640/642 and 648/650); and the surfaces of any exterior windows used to confine additional cooling fluids. The AR coatings can be applied on top of the conductive coating (i.e., the layer stack is electrode substrate/conductive coating (620/622)/AR coating (642/648) in the illustrated implementation. Depending on the particular application, one or more of these surfaces can be AR coated to improve optical transmission through the electro-optic device. Depending on the particular application, one or more of these surfaces can be tilted to reduce or minimize optical etalon effects. Thus, although all surfaces are coated in the implementation illustrated in FIG. 6, this is not required by the present invention. As an example, in some implementations using flowing liquid coolant, the liquid coolant may provide an index matching function, reducing or eliminating the need for an AR coating on the electro-optic crystal and the electrode coating. Thus, some surfaces may not be AR coated depending on the implementation. One of ordinary skill in the art would recognize many variations, modifications, and alternatives.

Figure 7:
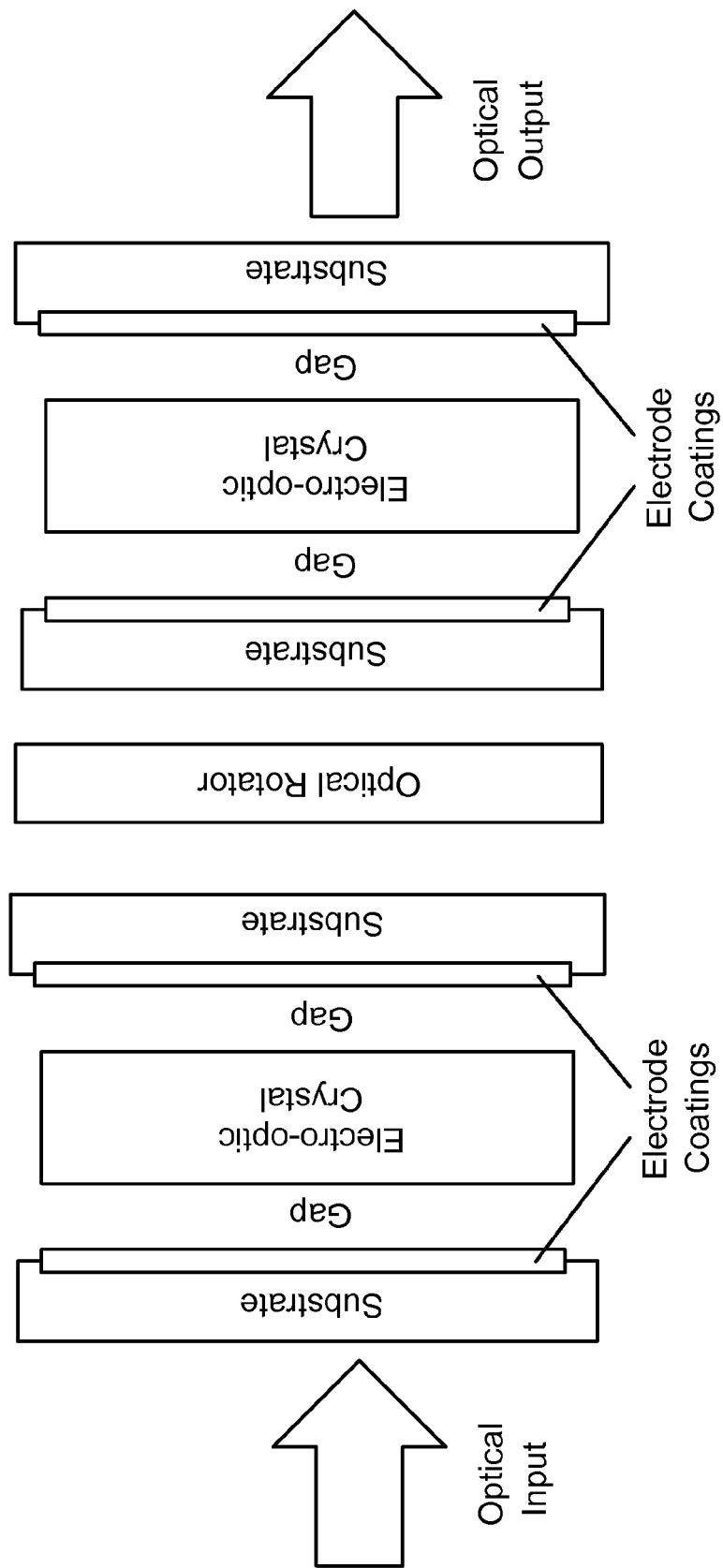
FIG. 7 is a simplified side view of a set of Pockels cells including birefringence compensation according to an embodiment of the present invention.

FIG. 7 is a simplified side view of a set of Pockels cells including birefringence compensation according to an embodiment of the present invention. For certain cooling geometries, or for very high optical power, the electro-optic device may exhibit a residual thermal birefringence that is undesirable. In this case, the thermal birefringence can be compensated using two electro-optic devices in series with an optical rotator crystal placed between them as shown in FIG. 7. The optical rotator can be realized with a chiral (optically active) crystal such as quartz or potassium dithionate. For operation at 1 µm wavelength, a quartz rotator will be approximately 13.7 mm thick. The rotator crystal will typically be AR coated. Alternatively, the optical rotator can use a Faraday rotator material in a magnetic field. Suitable Faraday rotator crystals include terbium gallium garnet, certain doped glasses, and the like.

In the embodiment illustrated in FIG. 7, it is desirable to use electro-optic crystals with identical or nearly identical thickness. Since the birefringence being compensated is much less than that of the transverse electrode configuration, the tolerance for thickness matching is significantly relaxed from the transverse configuration. For example, a 25 mm thick crystal of highly deuterated (98%) KDP will exhibit a thermal birefringence of $3.6 \times 10^{-4}$ and will require thickness matching to no better than 0.26 mm. For purposes of clarity in FIG. 7, AR coatings are not illustrated, but can be utilized.

An alternative approach to compensate excessive thermal birefringence is to separately heat the periphery of the electro-optic crystal. This could be accomplished, for example, with resistive heaters, by illumination from an additional optical source, or other suitable technique.

Figure 8:
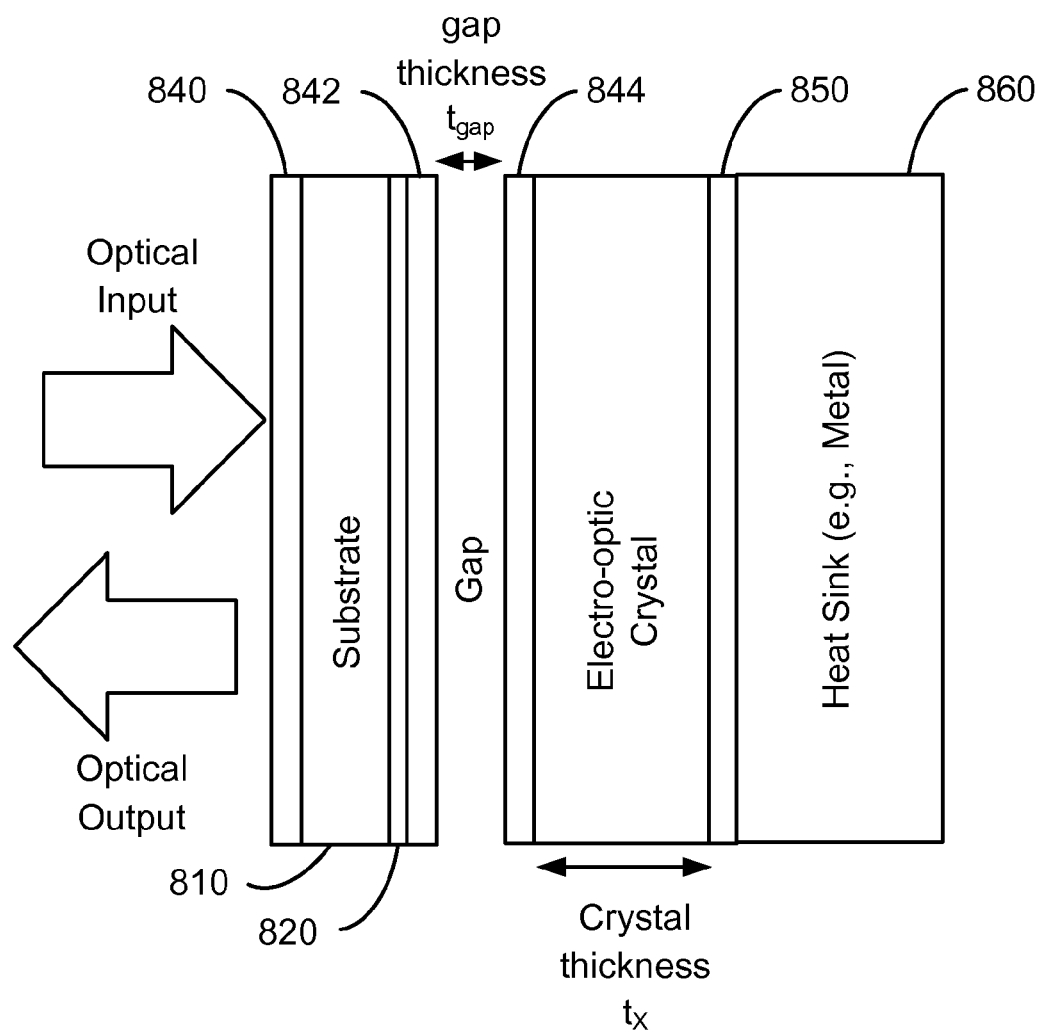
FIG. 8 is a simplified side view of a reflective switch according to an embodiment of the present invention.

FIG. 8 is a simplified side view of a reflective switch according to an embodiment of the present invention. In this implementation, the same electrode approach described above for a transmission mode device is applied to a reflection mode device. As illustrated in the figure, the single electrode is used in the form of a gap-coupled electrode substrate 810 including a transparent substrate having one face coated with a transparent, electrically conductive thin film 820. A metal heat sink 860 can be used to provide heat sinking. A coolant within the gap is optional in the illustrated embodiment. As a variant on the design illustrated in FIG. 8, the metal block can be coated with a high-reflection (HR) coating 850 to improve both the optical throughput and optical damage threshold of the electro-optic device. Application of a voltage across the electro-optic crystal will enable the polarization of the input light to be modified, providing a switching function. AR coatings 840/842/844 are illustrated. One of ordinary skill in the art would recognize many variations, modifications, and alternatives.

According to an embodiment of the present invention, a reflective electro-optic device is provided. The reflective electro-optic device comprises an electrode substrate having an input surface and an output surface and an electrode coating coupled to the output surface. The reflective electro-optic device also includes an electro-optic crystal having a first surface and a second surface. The first surface of the electro-optic crystal is separated from the electrode coating by a gap having a predetermined thickness. An HR coating is coupled to the second surface of the electro-optic crystal. The electro-optic crystal is mounted to a heat sink thermally coupled to the second surface of the electro-optic crystal. Light incident on the input surface of the electrode substrate passes through electrode substrate, the electrode coating, which is transparent, the gap, and the electro-optic crystal. The light is then reflected by the HR coating and passes back through the above structures as illustrated in FIG. 8.

Figure 9:
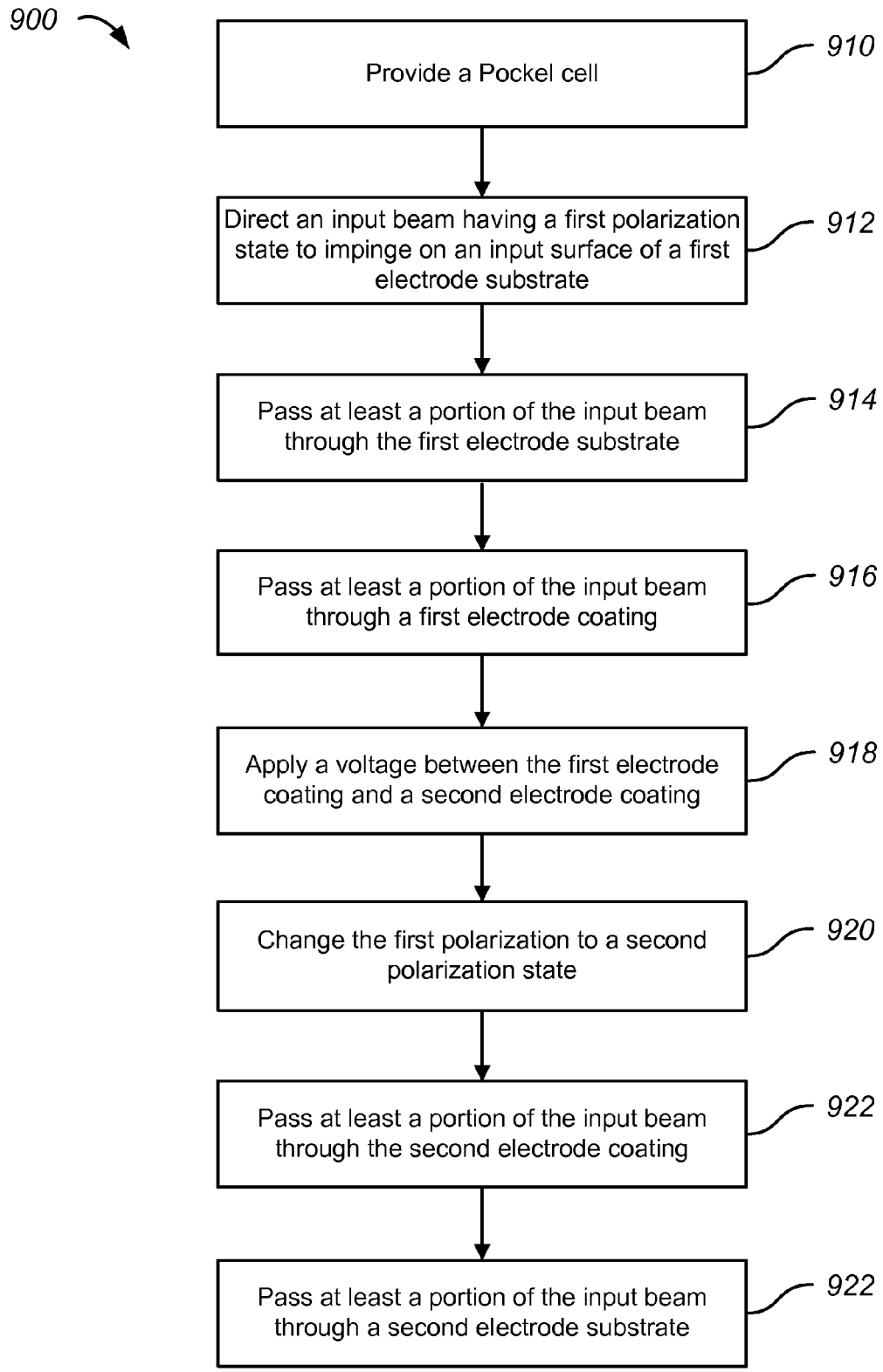
FIG. 9 is a simplified flowchart illustrating a method of operating a Pockels cell according to an embodiment of the present invention.

FIG. 9 is a simplified flowchart illustrating a method of operating a Pockels cell according to an embodiment of the present invention. The method includes providing a Pockels cell (910) having a first electrode substrate having an input surface, an output surface, and a first electrode coating coupled to the output surface. The Pockels cell also has an electro-optic crystal disposed adjacent to the first electrode substrate and a second electrode substrate having an input surface, an output surface, and a second electrode coating coupled to the input surface. As an example, the electro-optic crystal can be DKDP. As discussed throughout the present specification, the first electrode coating can include ITO and the second electrode coating can include ITO. The method also includes directing an input beam having a first polarization state to impinge on the input surface of the first electrode substrate (912), passing at least a portion of the input beam through the first electrode substrate (914), and passing at least a portion of the input beam through the first electrode coating (916).

The method further includes applying a voltage between the first electrode coating and the second electrode coating (918) and changing the first polarization state into a second polarization state using the electro-optic crystal (920). In some embodiments, the change in polarization state is associated with a phase difference between the second polarization state and the first polarization state of a half-wave, whereas in other embodiments, the change in polarization state is associated with a phase difference between the second polarization state and the first polarization state of a quarter-wave. Thus, the Pockels cell is able to function as a half-wave plate, a quarter-wave plate, or the like. During operation, the Pockels cell can convert light in a linear polarization state to a circular polarization state, an elliptical polarization state, or the like. Additionally, the method includes passing at least a portion of the input beam through the second electrode coating (922) and passing at least a portion of the input beam through the second electrode substrate (924).

It should be appreciated that the specific steps illustrated in FIG. 9 provide a particular method of operating a Pockels cell according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

The thermal and mechanical stresses due to laser-induced heating of a transparent, conducting thin film have been simulated. Changes due to optimization of the thin film's substrate were investigated. The properties of the film and substrate are shown in Table 1. Typical values were selected for the ITO optical absorption for annealed and unannealed films of thickness of 100 nm.

TABLE 1

| Material | Thermal Conductivity W/m-K | Heat Capacity J/kg-K | Density kg/cm$^3$ | Thermal Expansion ppm/K | Young's Modulus GPa | Optical Absorption |
|---|---|---|---|---|---|---|
| ITO (unannealed) | 3.2 | 365 | 7140 | 7.25 | 170 | 5% |
| ITO (annealed) | 3.2 | 365 | 7150 | 7.25 | 170 | 2% |
| DKDP | 1.4 | 857 | 2355.5 | 24.90 | | |
| Sapphire | 42.0 | 761 | 3980 | 7.00 | | |
| Fused Silica | 1.4 | 740 | 2200 | 0.55 | | |

The thermomechanical shock due to laser-induced heating of the coating was simulated using a transient, 1-dimensional thermal solver using temperature-independent material parameters. A coating thickness of 100 nm was used for all simulations. A square laser pulse of fluence 0.35 J/cm$^2$ and duration 3 ns was assumed, which was simulated with a uniform volumetric heating within the thin film. At 2% transparency and 100 nm film thickness, this corresponds to 2.33× 10$^{17}$ W/m$^3$ peak heat load during the pulse.

The thermal simulations provide maximum temperatures at the ITO surface and at the ITO-substrate interface. The interface temperature can be used to estimate the thermally induced stress and strain on the coating, using Strain $\in = \Delta\alpha\Delta T$ Stress $\sigma = E\in$, where $\Delta T$ is the temperature rise at the interface, $\Delta\alpha$ is the differential thermal expansion between the ITO and substrate, and E is the Young's modulus of the coating.

Results of the simulations of the laser-induce thermomechanical load are shown in Table 2. For unannealed ITO on DKDP, the coating temperatures are quite high. The corresponding mechanical stress is extremely high (due to the large expansion coefficient mismatch) as compared for example to the 165 MPa flexural strength of ITO. Annealing is not feasible on DKDP substrates, due to the destructive phase transition of DKDP at 145° C. These results semi-quantitatively explain the low optical damage threshold achievable for ITO deposited on DKDP, which result from the high optical absorption (due to higher material absorptivity), the poor thermal properties of DKDP, and the large expansion coefficient mismatch between ITO and DKDP.

TABLE 2

| Substrate | ITO Absorption | Temperature Rise (K) ITO Surface | Interface | Interface Loads Stress (MPa) | Strain |
|---|---|---|---|---|---|
| DKDP | 5% | 613.7 | 418.5 | 1255 | 7.40E–03 |
| Fused silica | 2% | 245.8 | 173.8 | 198 | 1.16E–03 |
| Sapphire | 5% | 559.8 | 142.0 | 6.0 | 6.50E–05 |
| Sapphire | 2% | 220.9 | 56.8 | 2.4 | 1.40E–05 |

Table 2 also shows how annealing (which lowers the coating absorption) improves the thermomechanical loads to improved levels. Notably, the maximum laser-induced temperature rise of the ITO is similar to the annealing temperatures typically used for TCO films (300~500° C.). These results explain the better optical damage resistance observed for ITO on glass substrates.

Finally, simulations indicate that the interface stress of annealed ITO on silica is still moderately high (198 MPa).

The same films exhibit much lower stress on sapphire substrates, because the sapphire provides better thermal transport of heat away from the interface due to its high thermal conductivity, as well as a closer expansion coefficient match to the ITO. These results imply that ITO will be significantly more robust (80× lower interface strain) to laser-induced heating when deposited on a sapphire substrate.

The following provide device designs and performance calculations related to embodiments of the present invention. Designs assume a 25×25 cm$^2$ aperture and utilize a highly deuterated, z-cut DKDP crystal. The DKDP properties used for calculations are:

| | |
|---|---|
| Absorption coefficient, z: | 0.25%/cm |
| Dielectric constant, z: | 48 |
| Half-wave Voltage: | 6.4 kV |
| Thermal conductivity, z: | 1.2 W/m-K |
| Thermal conductivity, xy: | 1.4 W/m-K |
| Temperature coefficient of ln V$_\pi$ = d ln V$_\pi$/dT: | 0.0132/K |
| Curie Temperature: | 222K |
| Curie Constant: | 3572K |
| Thermal expansion, z: | 44 ppm/K |
| Thermal expansion, xy: | 24.9 ppm/K |
| Mechanical stiffness tensor C$_{ij}$: | from Landolt Bornstein |

The ITO coating abosorption was assumed to be 2% per electrode.

Designs were evaluated assuming an optical beam of fluence of 0.345 J/cm$^2$ and repetition rate 16 Hz. This corresponds to a pulse energy of 215.6 J and average power 3.45 kW incident on the Pockels Cell.

The simulation methodology used analytic formulae for the switching voltage and device capacitance (plane parallel capacitor approximation with fringing fields neglected), for the internal crystal temperature variation, and for the caloric rise of flowing coolant. An analytic series expansion was used for mechanical plate deformations (bowing) due to pressure differentials.

The pressure drop due to fluid flow was calculated using the Petukhov correlation for smooth channels for turbulent flow, and using the Darcy formula for laminar flow. Convective heat transfer across flowing fluid boundary layers was calculated using the Gnielinski correlation for turbulent flows and a uniform temperature correlation for laminar flow. These results assume smooth channels, fully developed flows, and ignore pressure drops associated with transitions to and from the channels.

The loss due to optical scattering in turbulent gas flows was estimated using correlations determined from experimental data, for example, results were obtained for N$_2$, and were scaled to other gases using the ratio of Gladstone-Dale coefficients.

The extinction ratio degradation in the "off" state (no applied voltage) is degraded in some embodiments by thermal birefringence, which causes a small fraction of light to leak through the switch. This leakage was estimated from finite element calculations of the temperature distribution and its resulting strain distribution in the DKDP due to laser-induced heating (crystal absorption). These calculations used the anisotropic thermal and mechanical properties of the crystal. The strain distribution was mapped to birefringence using the formula:

$$\delta n = n^3 p_{66} \in_{xy},$$

where p is the strain-optic coefficient.

It is reported in our detailed results as the isolation, or inverse extinction ratio, which is 0.0 for an ideal device, and given by $$\sin^2 2\pi \delta n\, L/\lambda,$$

with finite thermal birefringence. While devices that are face-cooled should ideally exhibit no thermal birefringence, even with a linear transverse temperature gradient due to coolant caloric rise, the finite extent of the laser beam generally creates a finite birefringence due to transverse thermal diffusion at the edge of the laser beam.

The calculated extinction ratio degradation due to birefringence includes only thermal birefringence. It does not include the stress birefringence of windows and substrates subjected to pressure differentials; these effects can be mitigated, if necessary, by increasing the thickness of the mechanically stressed materials.

In the "on" state (nonzero applied voltage), lateral variations in the optical output polarization (and intensity after traversing a polarizer) can be induced by bowing of the electrode and thermal variations across the crystal. Bowing effects were estimate using parallel plate capacitor formulas for the local field in the crystal. Temperature effects were estimated from the temperature coefficient of $V_\pi$, and the temperature variation of the DKDP dielectric constant (Curie law).

The following sections provide the details for four different designs according to embodiments of the present invention. In all cases, the following design constraints were met:

The DKDP crystal thickness was always constrained to ensure that the internal longitudinal temperature variation (along z in FIG. 1) was <1° C. This maintains the internal stress within the crystal to less than 6% of the fracture limit.

The combination of DKDP thickness, gas composition, and gas pressure was always adjusted so that electric fields within the gas were always 1.8× less than the dielectric breakdown field of the gas.

The gap thickness was always at least 25 microns.

The pressure drop of flowing coolant never exceeded 1 psi.

The thickness of windows and substrates was always sufficient to provide at least 1.5× safety margin against fracture due to pressure differences across these materials.

The coolant inlet temperature to the device was 300 K, to avoid the need for refrigeration.

The four exemplary designs can be summarized as follows:

Typical designs require half-wave switching voltages of 21 to 31 kV. Certain designs offer switching voltages as low as 7 to 8 kV; however, these designs require maintaining stable gap dimensions of 25 to 50 microns, and are more susceptible to thermal birefringence.

Liquid cooled devices can offer extremely low thermal birefringence and can employ thin (<8 mm) DKDP crystals and sapphire substrates. The primary concern with these devices is long term stability of the liquid coolant at high optical power and fluence.

Devices with gas coolants require thick DKDP crystals (25 mm) and high gas pressures (5 atm) to avoid gas breakdown. This requires thick substrates or windows. It also causes a significant loss of local extinction ratio (1.2%) due to increased thermal birefringence. This reduced extinction value is localized to a small area of the crystal.

Transversely cooled devices exhibit worse local extinction (>2%).

| Design 1: Face-cooled Design with Flowing Gas Coolant in the Gap (Reference can be made to FIG. 3) | |
|---|---|
| Design Parameters | |
| Crystal thickness: | 25 mm |
| Gap thickness: | 1.0 mm |
| Substrate: | c-plane sapphire |
| Substrate thickness: | 20 mm |
| Coolant: | 1:1 He:$SF_6$ by volume, 5 atm pressure |
| Coolant flow: | 18 m/s |
| Thermal and Cooling Performance | |
| Caloric rise of coolant: | 0.3° C. |
| Crystal internal temperature rise: | 0.9° C. |
| Boundary layer temperature rise: | 2.6° C. (crystal to coolant interface) |
| Total crystal temperature rise: | 3.8° C. |
| Coolant flow pressure drop: | 0.5 psi |
| Electrical Performance | |
| Half-wave switch voltage: | 30.9 kV |
| Capacitance: | 257 pF |
| Electro-optic Performance | |
| Optical absorption: | 4.6% (KDP plus ITO) |
| Optical scattering loss: | 0.16% ($SF_6$ gas) |
| Local Extinction degradation | 1.22% (thermal birefringence) |
| Contrast degradations in transmission | |
| Bowing | <0.01% |
| Lateral temperature variation | <0.01% |

It should be noted that the electric field in the gap is at a level 1.8× below the breakdown field of the gas; the switching voltage can be reduced to 23.5 kV by reducing the gap to 0.7 mm, changing the coolant flow to 8.4 m/s, and allowing a caloric rise of 0.6 C. These changes result in an increased device capacitance of 337 pF; the 2 cm substrate thickness provides sufficient fracture resistance and prevents substrate bowing (localized switch voltage variations due to the pressurized coolant); a 9.2 cm silica substrate could be used in place of the sapphire. However, the damage resistance of the ITO would likely be reduced.

| Design 2: Face-cooled Design with Flowing Liquid Coolant in the Gap (Reference can be made to FIG. 3) | |
|---|---|
| Design Parameters | |
| Crystal thickness: | 8 mm |
| Gap thickness: | 0.4 mm |
| Substrate: | c-plane sapphire |
| Substrate thickness: | 5 mm |
| Coolant: | fluorinated decalin |
| Coolant flow: | 0.24 m/s |
| Thermal and Cooling Performance | |
| Caloric rise of coolant: | 0.1° C. |
| Crystal internal temperature rise: | 0.1° C. |
| Boundary layer temperature rise: | 2.0° C. (crystal to coolant interface) |

| Design 2: Face-cooled Design with Flowing Liquid Coolant in the Gap (Reference can be made to FIG. 3) | |
|---|---|
| Total crystal temperature rise: | 2.2° C. |
| Coolant flow pressure drop: | 1.0 psi |
| Electrical Performance | |
| Half-wave switch voltage: | 20.8 kV |
| Capacitance: | 1194 pF |
| Electro-optic Performance | |
| Optical absorption: | 4.2% (KDP plus ITO) |
| Optical scattering loss: | 0% ($SF_6$ gas) |
| Local Extinction degradation | 0.02% |
| | (thermal birefringence) |
| Contrast degradations in transmission | |
| Bowing | <0.01% |
| Lateral temperature variation | <0.01% |

It should be noted that the liquid coolant can be externally filtered (micropore) to remove potential impurities generated by laser-induced degradation.

| Design 3. Face-cooled Design with Flowing Gas Coolant External to the Substrate (Reference can be made to FIG. 4) | |
|---|---|
| Design Parameters | |
| Crystal thickness: | 25 mm |
| Gap thickness: | 0.050 mm |
| Gap material: | stagnant 1:1 He:$SF_6$ by volume, 5 atm pressure |
| Substrate: | c-plane sapphire |
| Substrate thickness: | 1 mm |
| Window: | Fused silica |
| Window thickness: | 10 mm |
| Coolant: | 1:1 He:$SF_6$ by volume, 5 atm pressure |
| Coolant flow: | 25.5 m/s |
| Thermal and Cooling Performance | |
| Caloric rise of coolant: | 0.4° C. |
| Crystal internal temperature rise: | 0.9° C. |
| Boundary layer temperature rise: | 4.8° C. |
| | (crystal to coolant interface) |
| Total crystal temperature rise: | 6.1° C. |
| Coolant flow pressure drop: | 0.2 psi |
| Electrical Performance | |
| Half-wave switch voltage: | 7.6 kV |
| Capacitance: | 1041 pF |
| Electro-optic Performance | |
| Optical absorption: | 4.6 % (KDP plus ITO) |
| Optical scattering loss: | 0% ($SF_6$ gas) |
| Local Extinction degradation | TBD, >1.22% |
| | (thermal birefringence) |
| Contrast degradations in transmission | |
| Bowing | 0% |
| Lateral temperature variation | <0.01% |

It should be noted that the electric field in the gap is at a level 1.8× below the breakdown field of the gas; since no turbulent $SF_6$ flow occurs in the coolant, scattering loss is essentially zero; since there is no pressure drop across the substrate, it's thickness is constrained only by mechanical robustness considerations; since there is no pressure drop across the substrate, there is no bowing-induced degradation of the contrast; to simplify gas handling, a variant of this design uses the 1:1 He:$SF_6$ mixture for both the gap and gas and flowing coolant. This reduces the boundary layer rise to 2.6° C. and the total temperature rise to 4.1° C. However, it increases the optical scattering loss to 0.03%.

| Design 4. Edge-cooled (conduction cooled) Design with Stagnant Gas in the Gap (Reference can be made to FIG. 5) | |
|---|---|
| Design Parameters | |
| Crystal thickness: | 25 mm |
| Gap thickness: | 0.025 mm |
| Gap material: | stagnant 1:1 He:$SF_6$ by volume, 5 atm pressure |
| Substrate: | c-plane sapphire |
| Substrate thickness: | 23 mm |
| Flowing coolant: | None |
| Thermal and Cooling Performance | |
| Transverse temperature variation: | 1.8° C. |
| | (variation across crystal aperture) |
| Crystal internal temperature rise: | 0.9° C. |
| Total crystal temperature rise: | not calculated |
| Electrical Performance | |
| Half-wave switch voltage: | 7.0 kV |
| Capacitance: | 1131 pF |
| Electro-optic Performance | |
| Optical absorption: | 4.6% (KDP plus ITO) |
| Optical scattering loss: | 0% ($SF_6$ gas) |
| Local Extinction degradation | 2.1% (thermal birefringence) |
| Contrast degradations in transmission | |
| Bowing | 0% |
| Lateral temperature variation | 0.03% |

It should be noted that the electric field in the gap is at a level 1.8× below the breakdown field of the gas; since no turbulent $SF_6$ flow occurs in the coolant, scattering loss is essentially zero.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An electro-optic device comprising:
   an electro-optic crystal having a predetermined thickness and a first face;
   an electrode substrate disposed opposing the first face, wherein the electrode substrate comprises a substrate material having a thickness and a first electrode coating coupled to the substrate material, wherein a first gap operable to receive a coolant fluid is defined between the first face and the first electrode coating; and
   a voltage source electrically coupled to the first electrode coating.

2. The electro-optic device of claim 1 wherein the electro-optic crystal further comprises a second face, the electro-optic device further comprising a second electrode substrate disposed opposing the second face, wherein the second electrode substrate comprises a second substrate material having a second thickness and a second electrode coating coupled to the second substrate material, wherein the voltage source is electrically coupled to the second electrode coating.

3. The electro-optic device of claim 2 wherein at least one of the substrate material or the second substrate material comprises sapphire.

4. The electro-optic device of claim 2 wherein at least one of the first electrode coating is positioned between the substrate material and the electro-optic crystal or the second electrode coating is positioned between the second substrate material and the electro-optic crystal.

5. The electro-optic device of claim 2 wherein the first electrode coating and the second electrode coating comprise ITO.

6. The electro-optic device of claim 2 further comprising an anti-reflection coating disposed on at least one of the first electrode coating or the second electrode coating.

7. The electro-optic device of claim 6 further comprising an anti-reflection coating disposed on the first face and the second face.

8. The electro-optic device of claim 2 wherein a second gap is defined between the second electrode coating and the second face.

9. The electro-optic device of claim 8 further comprising a coolant fluid disposed in at least one of the first gap or the second gap.

10. The electro-optic device of claim 8 wherein the coolant fluid comprises a gas operable to flow through at least one of the first gap or the second gap.

11. The electro-optic device of claim 8 wherein the coolant fluid comprises a liquid operable to flow through at least one of the first gap or the second gap.

12. The electro-optic device of claim 8 further comprising:
  a set of windows disposed external to the first electrode substrate and the second electrode substrate;
  a coolant operable to flow between the set of windows and the first electrode substrate and the second electrode substrate; and
  wherein the coolant fluid comprises a stagnant fluid.

13. The electro-optic device of claim 2 wherein at least one of the first electrode substrate is tilted with respect to the first face or the second electrode substrate is tilted with respect to the second face.

14. The electro-optic device of claim 1 wherein the electro-optic crystal comprises DKDP.

15. A method of operating a Pockels cell, the method comprising:
  providing a Pockels cell having:
    a first electrode substrate having an input surface, an output surface, and a first electrode coating coupled to the output surface;
    an electro-optic crystal disposed adjacent to the first electrode substrate, wherein a first gap operable to receive a coolant fluid is defined between the first electrode coating and the electro-optic crystal; and
    a second electrode substrate having an input surface, an output surface, and a second electrode coating coupled to the input surface, wherein a second gap operable to receive the coolant fluid is defined between the second electrode coating and the electro-optic crystal;
  directing an input beam having a first polarization state to impinge on the input surface of the first electrode substrate;
  passing at least a portion of the input beam through the first electrode substrate;
  passing at least a portion of the input beam through the first electrode coating;
  applying a voltage between the first electrode coating and the second electrode coating;
  changing the first polarization state into a second polarization state using the electro-optic crystal;
  passing at least a portion of the input beam through the second electrode coating; and
  passing at least a portion of the input beam through the second electrode substrate.

16. The method of claim 15 wherein the electro-optic crystal comprises DKDP, the first electrode coating comprises ITO, and the second electrode coating comprises ITO.

17. The method of claim 15 further comprising flowing a first coolant in the first gap and flowing a second coolant in the second gap.

18. The method of claim 15 wherein a phase difference between the second polarization state and the first polarization state comprises a half-wave.

19. The method of claim 15 wherein a phase difference between the second polarization state and the first polarization state comprises a quarter-wave.

20. The method of claim 15 wherein the first polarization state comprises a linear polarization state and the second polarization state comprises a circular polarization state.

21. A reflective switch comprising:
  an electrode substrate having a input surface and a second surface opposing the input surface;
  an electrically conductive coating disposed on the second surface;
  an electro-optic crystal opposing the electrode substrate, wherein a gap, which is operable to receive a coolant fluid, is defined between the electrically conductive coating and the electro-optic crystal; and
  a heat sink thermally coupled to the electro-optic crystal.

22. The reflective switch of claim 21 wherein the electrode substrate comprises sapphire.

23. The reflective switch of claim 21 wherein the electrically conductive coating comprises ITO.

24. The reflective switch of claim 21 wherein the electro-optic crystal is substantially parallel to the electrode substrate.

25. The reflective switch of claim 21 wherein the electrically conductive coating comprises an adhesion layer disposed on the second surface and a transparent film disposed on the adhesion layer.

26. The reflective switch of claim 21 further comprising a high-reflection coating disposed between the electro-optic crystal and the heat sink.

27. The reflective switch of claim 21 further comprising anti-reflection coatings disposed on the input surface, the electrically conductive coating, and at least one surface of the electro-optic crystal.

28. The reflective switch of claim 21 wherein the coolant fluid comprises $SF_6$ operable to flow in the gap.

* * * * *